United States Patent [19]

Hilton et al.

[11] Patent Number: 4,698,635

[45] Date of Patent: Oct. 6, 1987

[54] RADAR GUIDANCE SYSTEM

[75] Inventors: Richard D. Hilton, King George, Va.; Godfrey T. Coate, Belmont, Mass.

[73] Assignee: The United States of America as represented by the Secretary of the Navy, Washington, D.C.

[21] Appl. No.: 835,206

[22] Filed: Mar. 2, 1986

[51] Int. Cl.$^4$ ............................................. G01S 13/89
[52] U.S. Cl. .................................... 342/64; 342/120; 342/189; 364/423; 364/456
[58] Field of Search .................................... 342/61–65, 342/120, 123, 127, 134, 135, 145, 189, 195, 159–162, 202; 364/444, 445, 447–449, 456, 457, 423, 424, 427–429, 443

[56] References Cited

U.S. PATENT DOCUMENTS

| | | | |
|---|---|---|---|
| 3,328,795 | 6/1967 | Hallmark | 342/64 |
| 3,742,495 | 6/1973 | Diamantides | 342/64 |
| 3,805,261 | 4/1974 | Deschamps et al. | 342/64 |
| 3,879,728 | 4/1975 | Wolff | 342/64 |
| 4,144,571 | 3/1979 | Webber | 342/63 X |
| 4,175,285 | 11/1979 | Dansac et al. | 364/456 |
| 4,179,693 | 12/1979 | Evans et al. | 342/64 |
| 4,347,511 | 8/1982 | Hofmann et al. | 342/64 |
| 4,490,719 | 12/1984 | Botwin et al. | 342/64 |
| 4,495,580 | 1/1985 | Keearns | 364/450 |
| 4,514,733 | 4/1985 | Schmidtlein et al. | 342/64 |
| 4,520,445 | 5/1985 | Keearns | 364/450 |
| 4,584,646 | 4/1986 | Chan et al. | 364/449 |

*Primary Examiner*—T. H. Tubbesing
*Assistant Examiner*—Bernarr Earl Gregory
*Attorney, Agent, or Firm*—Elmer E. Goshorn; William C. Townsend

[57] ABSTRACT

Improved radar guidance system for the navigation apparatus of an aircraft as it flies over substantially flat terrain with random and different features. The system is generally made up of an airborne radar altimeter, a video signal processor and a master processor. The altimeter transmits a series of pulses at predetermined time intervals for impacting a plurality of spaced points along the aircraft ground track. The echo signal of each pulse-impacted point processor divides the amplified signal into corresponding signals. A comparator of the signal processor transforms one of the divided signals into a constant output. A track and hold arrangement of the signal processor correlates the delayed leading edge of the comparator output with the other of the divided signals so as to determine a point of intersection therebetween. The intersection point is a quantitized value of the delay sample of a given echo signal that is indicative of the average weighted reflectivity value of a preselected annulus of one or more random and different features about a pulse-impacted track point. The master processor combines a series of delay samples into a sample data array and then compares the sample array with a series of data arrays of a stored data matrix at a given altitude of the aircraft for the purpose of determining the aircraft flight path. Depending on the requirements of the signal processor, a Doppler filter may be used.

19 Claims, 16 Drawing Figures

| RING ABOUT A CELL | FEATURES AND REFLECTIVITY | | | | WEIGHTED AVERAGE REFLECTIVITY |
|---|---|---|---|---|---|
| | FOREST-ED AREA Refl.=2 | FIELD Refl.=7 | WATER Refl.=17 | ASPHALT ROAD Refl.=24 | |
| CELL 13 | 33% | 74% | 0 | 4% | 6.6 |
| CELL 18 | 0 | 66% | 30% | 4% | 10.7 |
| CELL 23 | 0 | 45% | 55% | 0 | 12.5 |
| CELL 28 | 0 | 35% | 65% | 0 | 13.5 |
| CELL 33 | 25% | 50% | 25% | 0 | 8.3 |

RADAR GUIDANCE SYSTEM

This invention concerns a radar guidance system for an airborne vehicle and more particularly it relates to an improved radar guidance system for use with a navigational apparatus of an airborne vehicle so as to enable the determination of the correct flight path or terminal fix of the vehicle during flight over substantially flat terrain.

BACKGROUND OF THE INVENTION

Various guidance systems have been designed in the past for assisting an airborne vehicle in determining if it is following its intended flight path and if not to provide a correctional signal to the navigation apparatus. For example, U.S. Pat. No. 3,328,795 to Hallmark discloses a guidance system for ascertaining the flight path of an airborne vehicle over hilly terrain. The guidance system is provided with an altimeter arrangement for determining the difference in elevation from one radar pulsed area of the hilly terrain to another along the ground track of the vehicle. The computer of the system compares the reflected signals of the different pulsed areas of the hilly terrain with its data base in order to ascertain the vehicle flight path. U.S. Pat. No. 4,144,571 to Webber relates to another airborne vehicle guidance system for use only on hilly terrain. The system is generally made up of a processor for receiving data from storage, and also for receiving data of a radar sample of hilly terrain for indicating aircraft elevation. The processor includes a Kalman filter for resolving the aforesaid data into an updated three coordinate airborne position of the aircraft prior to the guidance system taking another radar sample of a hilly terrain section for another updated position of the aircraft along its flight path. U.S. Pat. No. 4,495,580 to Kearns discloses an airborne automated navigation system for automatically monitoring the position and velocity of an aircraft along its flight path while at the same time correcting the position of the aircraft when it is not along its intended path. The system is generally made of a radar altimeter, a navigation device, and a stored reference map. When sampled outputs of the navigation device and altimeter are correlated with the stored map, and such correlation, e.g., indicates that the aircraft is deviating from its intended path, a data register output of the system transmits a correction signal output to the navigation device so as to direct the aircraft flight control to follow the correct course. However, none of the aforediscussed references whether taken alone or in any combination remotely suggest the improved aircraft guidance system of the invention for controlling the operation of a navigation apparatus in maintaining the aircraft along its intended flight path (especially at a terminal fix) and even though the aircraft is flying over substantially flat terrain with random and different features therealong. The system is generally made up of a radar altimeter, a video signal processor and a master processor connected to both the altimeter and the signal processor. The altimeter transmits a series of pulses at predetermined time intervals for impacting a plurality of relatively spaced points along the ground track of the aircraft vehicle. The signal processor receives the echo signature of each radar-pulse impacted ground track point and is provided with means for dividing each signature into first and second signals. One of the divided signals is transformed and delayed and then recombined with the other divided signal so as to determine an intersection point between the signals. This point is a quantitized value of a given signature that indicates the average weighted reflectivity value of an annulus about a pulse-impacted ground-track point. The quantitized value of each signature is then transformed by the signal processor into digital form. The master processor receives the digital signal of each signature and combines same into a series of digital signals that represents a sample data array. The sample array is then compared with a series of digital arrays of a stored matrix for the purpose of substantially matching the sample array with one of the stored arrays thereby enabling an accurate determination of the vehicle flight path.

SUMMARY OF THE INVENTION

An object of the invention is to provide an improved radar guidance system for aircraft and the like over substantially flat terrain having random and different features therealong.

Another object of the invention is to provide an improved radar guidance system for aircraft that can be readily inserted into existing aircraft radar guidance systems for enhancing the usefulness and sensitivity thereof.

Still another object of the invention is to provide an improved aircraft radar guidance system for transforming a plurality of radar altimeter echo signals into a series of delay line samples for the purpose of minimizing bandwidth requirements of the system while at the same time enabling the construction of a compact and effective guidance system.

In summary, the improved aircraft radar guidance system is generally made up of a radar altimeter, a video signal processor, and a master processor that is separately connected to both the signal processor and the altimeter. The navigation apparatus of the aircraft during flight transmits a signal to the master processor for initiation of the guidance system such as, e.g., when a terminal fix position is required by a missile prior to striking a target. At this time the master processor transmits a signal to the radar altimeter for transmitting a series of radar pulses at predetermined time intervals for impacting a plurality of relatively spaced points along the aircraft ground track of substantially flat terrain having one or more random and different features therealong. Each pulse, as initially transmitted from the altimeter, is preferably of very short or compressed time duration.

The echo signal about each pulse-impacted ground-track point is transmitted by the altimeter to a logarithmic amplifier of the video signal processor. The output of the amplifier is divided into two signals. One of the divided signals is directed to the positive input of a comparator of the signal processor. The master processor is series interconnected to a threshold register and a digital-to-analog converter. The output of the converter is connected to the negative bias input of the comparator. The master processor during an operative mode of the guidance system and prior to the master processor transmitting a command signal to the altimeter to transmit a series of radar pulses, functions to determine the noise threshold level as the aircraft advances along its flight path. When the noise threshold level is determined by the master processor, the register transmits a signal to the comparator for substantially removing the noise level from each signal received by its positive input. The output of the comparator transforms each divided echo signal received into a noise-free, constant output.

The signal processor is also provided with a delay line device and a track-and-hold arrangement. The device is connected to the output of the comparator and serves to delay the leading edge of each transformed comparator output of any amplified echo signal received by the system. The track-and-hold arrangement is separately connected to the delay line device output and the other divided output of the amplifier. The arrangement functions to correlate the output of the other divided signal of a given echo signature with its associated transformed and delayed output of the one divided signal. This correlation enables the determination of a point of intersection between the outputs at the leading edge of the one transformed and delayed output. The point of intersection that is determined for each echo signature is indicative of a quantitized value of a delay-sample annulus of average-weighted reflectivity value of one or more random and different terrain features about a pulse-impacted ground-track point. The quantitized value output of the arrangement for the correlated and transformed signals of each echo signal received is directed to an analog-to-digital (A/D) converter of the signal processor.

The master processor receives the digital output from the A/D converter of each quantitized value of an echo signal and combines all of the digital outputs received into a series of digital samples that form a single delay sample data array for each ground track radar pulse operative mode of the guidance system. The master processor then further functions to compare the delay sample array with a series of stored data arrays of a stored matrix at a given altitude for the aircraft flight so that the processor is able to accurately determine the location of the ground track path as previously sensed by a series of pulses from the guidance system of the invention. If the actual ground track path does not correspond to the intended ground track path of the vehicle, the master processor transmits a signal to the navigation apparatus for correcting the flight path of the vehicle.

Depending on the requirements of the guidance system, a Doppler filter may be incorporated or connected to the output of the logarithmic amplifier of the signal processor. During operation, the filter will remove all unit areas of an amplified echo signature except diametrically opposed areas of the echo signature in relation to a pulse-impacted ground-track point. These diametrically-opposed areas are generally perpendicular to the ground track of the aircraft. One of the advantages of the Doppler filter is that it assures a more definitive delay line sample of an echo signature for analysis without sacrificing sensitivity of the improved guidance system.

The term "quantization" or "quantitized value" as used throughout the specification and claims specifically refers to a common point between an echo signature waveform that stems from a radar pulse-impacted point along the ground track of an airborne vehicle and a corresponding waveform extracted or divided-out from the echo signature waveform. The extracted waveform is transformed into a constant output. The leading edge of the constant output is then delayed a predetermined amount so as to enable the formation of a common point between the two waveforms that is indicative of a value which is of assistance in determining the ground track of an airborne vehicle, e.g., the average-weighted reflectivity value of a delay sample annulus about the radar pulse-impacted point along the ground track of the airborne vehicle.

Other objects and advantages of the invention will become more apparent when taken in conjunction with the following description of the invention together with the accompanying drawings, wherein:

DETAILED DESCRIPTION OF THE INVENTION

Figure 1:
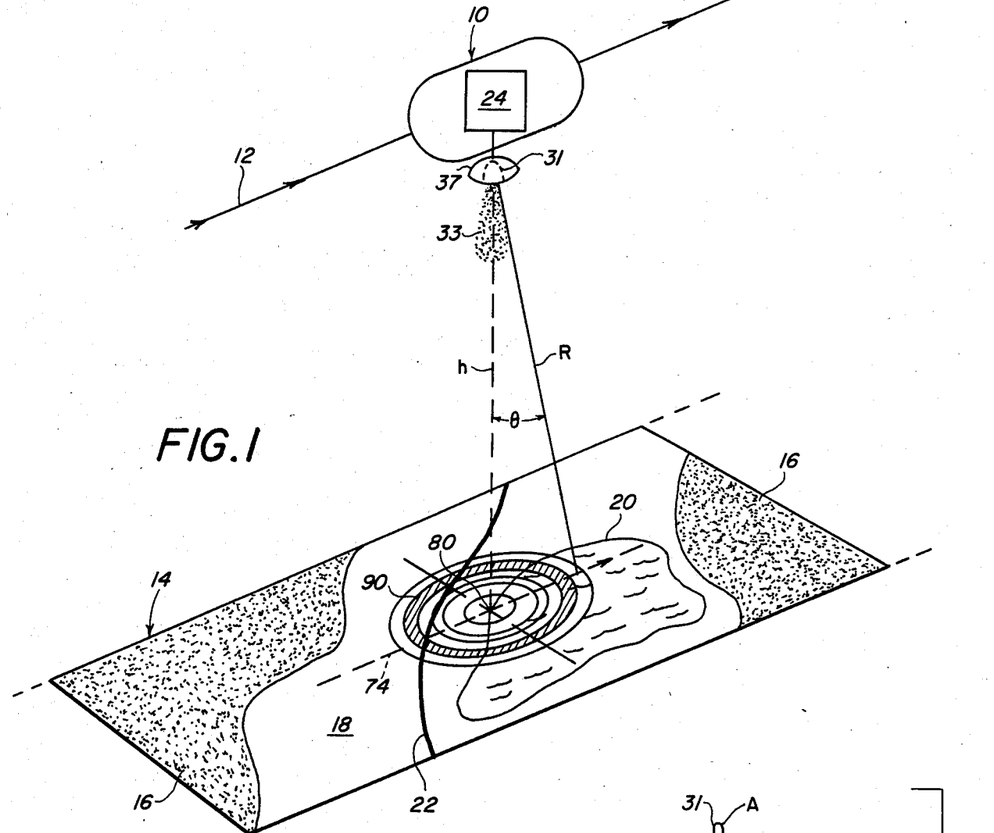
FIG. 1 is a diagrammatic view of an operative embodiment of the improved airborne radar guidance system of the invention.

With further reference to FIG. 1, an aircraft 10, such as, e.g., a pilotless missile, is flying along its flight path 12 at a desired altitude above a substantially flat terrain 14 having one or more random and different features. These random and different features are, for purposes of illustration, a series of two forested areas 16, a field 18, a body of water 20 and an asphalt-covered road 22. Because of the various forces encountered by aircraft 10, its actual flight path after a flight period is usually a deviation from the intended vehicle path. Depending on the importance of maintaining the intended path, an improved guidance system 24 is provided for maintaining the desired flight path over substantially flat terrain as will now be described.

Figure 1A:
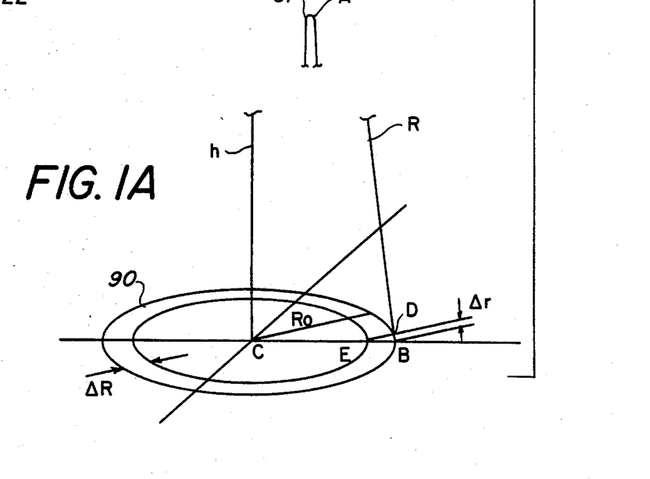
FIG. 1A is an enlarged, fragmented, diagrammatic view of FIG. 1 with parts added, and illustrates further details of the invention.

It is further evident from FIGS. 1 and 1A, that for analyzing the capability of system 24, a radius line R can be drawn from antenna 29 to the outer circumference of annulus 90. Then a perpendicular line DE is projected from the lower end of R so as to intersect the inner circumference of annulus 90. As the result of projecting line DE, a right triangle BDE is formed that is similar to right triangle BCA. Since altitude "h" of aircraft 10 is known, both range resolution $\Delta r$ and radial extent $\Delta R$ of annulus 90 can be readily determined. Determining parameters $\Delta r$ and $\Delta R$ are important in designing the components of system 24 so as to provide accurate analysis of relatively spaced and sensed annular areas of random flat terrain in determining the flight path of aircraft 10.

Figure 2:
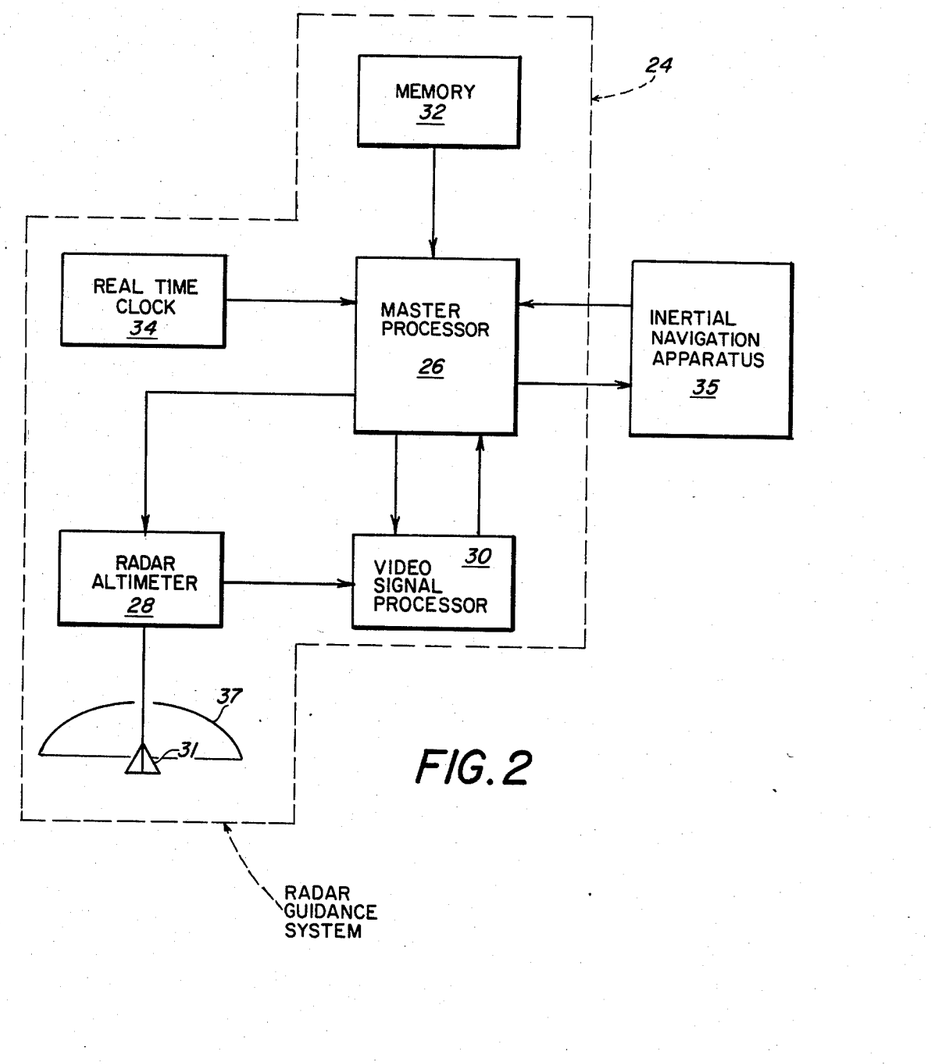
FIG. 2 is a diagrammatic view of various electronic components of the invention.

As illustrated in FIG. 2, system 24 is generally made up of a master processor 26, a radar altimeter 28, and a video signal processor 30. Processor 26 can be any suitable commercial device such as, e.g., a microprocessor furnished by National Semiconductor, Inc. and designated IMP-16C. A memory 32 has stored therein cartographic map data of substantially flat terrain with random and different features over which aircraft 10 is to fly. The data is made up in matrices of more than one section of the terrain where each matrix or grid is generally made up of a series of data arrays. The series of arrays of a matrix is for a given altitude of the aircraft and relates to a series of average-weighted reflectivity values of a particular area of flat terrain 14 with the area usually having one or more random and different features as will be more fully explained hereinafter. A real time clock 34 is connected to processor 26. An inertial navigation apparatus 35 of aircraft 10 is also connected to processor 26. Altimeter 28 is provided with a conical-shaped downward-looking antenna 31 for transmitting a series of radar pulses with each pulse 33 of the series being preferably of compressed time duration and teardrop-like configuration as shown in FIG. 1. The altimeter also includes an inverted coaxial dish-shaped antenna 37 for receiving each echo signature or signal of a radar pulse and/or noise.

Figure 3:
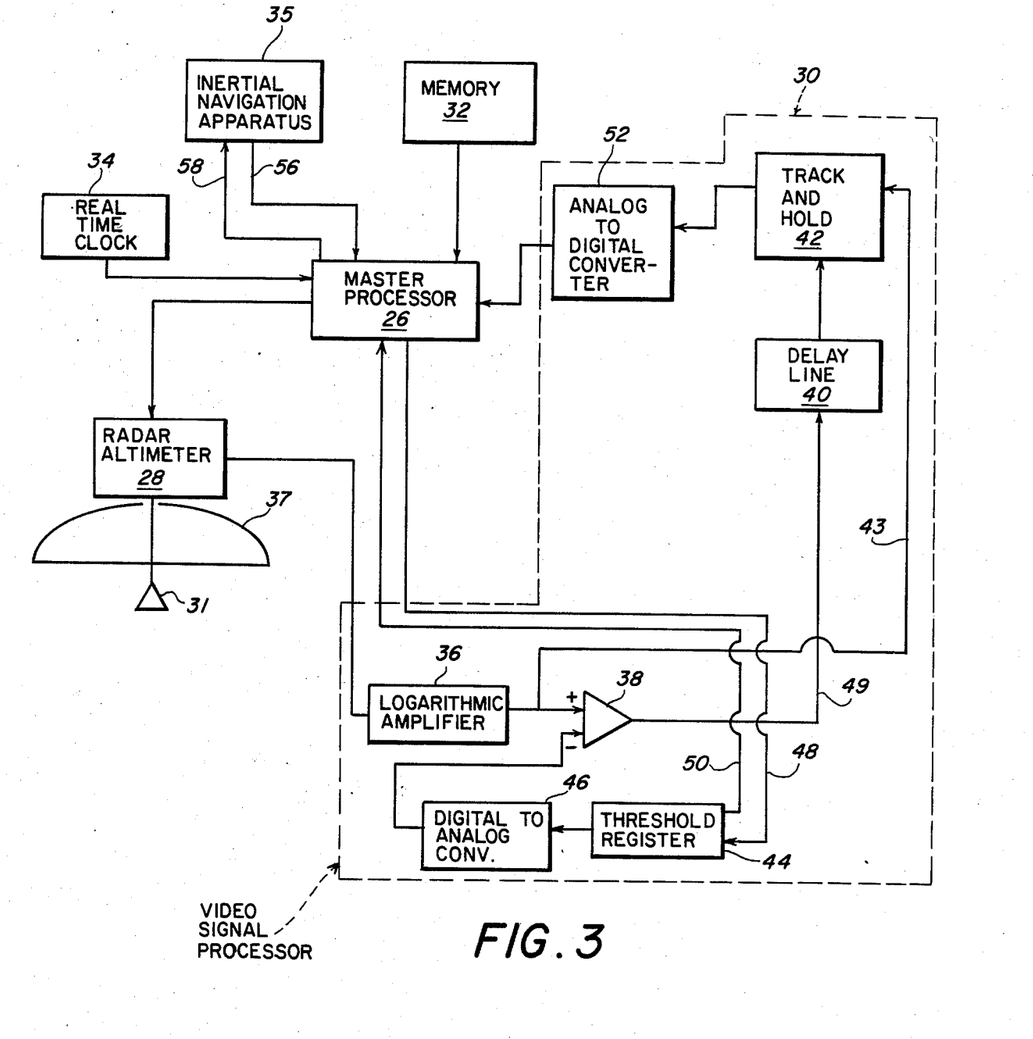
FIG. 3 is a diagrammatic view similar to FIG. 2, but illustrating further details of the invention.

As best shown in FIG. 3, signal processor 30 is generally made up of a logarithmic amplifier 36, a comparator 38, a delay line device 40 and a track-and-hold (T/H) arrangement 42. A suitable commercial device for T/H arrangement 42 is furnished by Analog Devices, Inc., and is designated HTS-0100. The output of amplifier 36 is parallel connected to the analog input of comparator 38 and, via lead 43, to the analog input of the T/H arrangement. The signal processor is also generally made up of a threshold register 44 and a digital-to-analog (D/A) converter 46. Another output of the master processor via lead 48 is connected to the input of register 44. Register 44 and converter 46 are series interconnected to the negative input of comparator 38. Register 44, via lead 50, is feed-back connected to processor 26. The output of comparator 38, via lead 49, is connected to the input of delay device 40. The signal processor also includes an analog-to-digital (A/D) converter 52 that is connected to the output of T/H arrangement 42. The output of converter 52 is connected to processor 26.

Navigation apparatus 35 of aircraft is connected via its output 56 to processor 26. Another output 58 of processor 26 is connected to the navigation apparatus.

Figure 4:
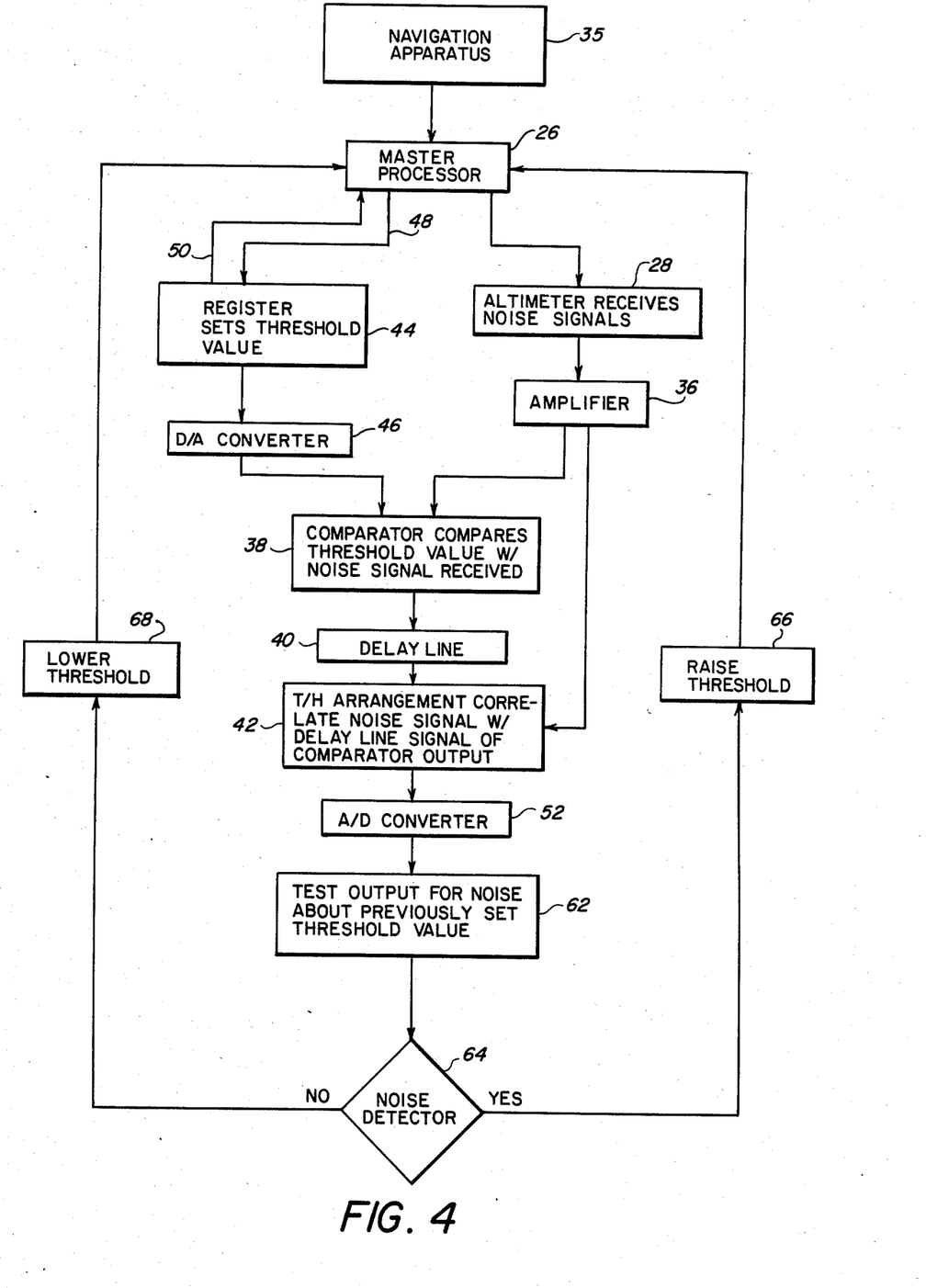
FIG. 4 is a diagrammatic view of a flow chart of an operative embodiment of the guidance system for the purpose of determining the noise threshold level of the environment in relation to the guidance system of the invention during aircraft use.

Prior to a series of any suitable number of radar pulses being transmitted by altimeter 28, such as, e.g., a series of "N" radar pulses, in order to locate the actual flight path of vehicle 10, guidance system 24 initially and advantageously functions to determine the threshold noise level of the environment in the vicinity of the aircraft. With reference to the flowchart of FIG. 4, a signal is sent by navigation apparatus 35 to start processor 26. To this end, the processor, via lead 48, initially sets a threshold value for register 44 as confirmed by feedback 50. The threshold value is converted to analog form by converter 46 and transmitted to the negative input of comparator 38. The comparator also receives the amplified analog noise signal from amplifier 36 as initially received by altimeter receiver antenna 37. Assuming that the processor-set threshold value is below the level of the amplified noise signal received by altimeter antenna 37, the output of comparator 38 is delayed by element 40. Element 42 correlates the delayed output of element 40 with the amplified noise output of amplifier 36. Such correlation results in a point of intersection between the correlated signals. This point determines the quantitized value which is digitized by converter 52. The output of converter 52 will indicate noise when tested by tester 62, and then detected by detector 64. Element 66 will then instruct processor 26 to raise the threshold value for register 44. Assuming that the next-set-threshold value of register 44 by processor 26 is above the level of the noise signal received by altimeter 28, the output of comparator 38 will be zero, and the noise signal detected by element 64 will be zero. Consequently, detector 64 will transmit an output, via element 68, to lower the threshold value that is set by processor 26 for register 44. Thus, it is evident that processor 26 of system 10 repeats itself again and again until the best threshold value is found for register 44 in relation to the noise received by altimeter 28 during flight of aircraft 10 so as to substantially eliminate noise from an echo signature when system 10 is being operated in the radar pulse mode as will be more fully explained hereinafter.

Figure 5:
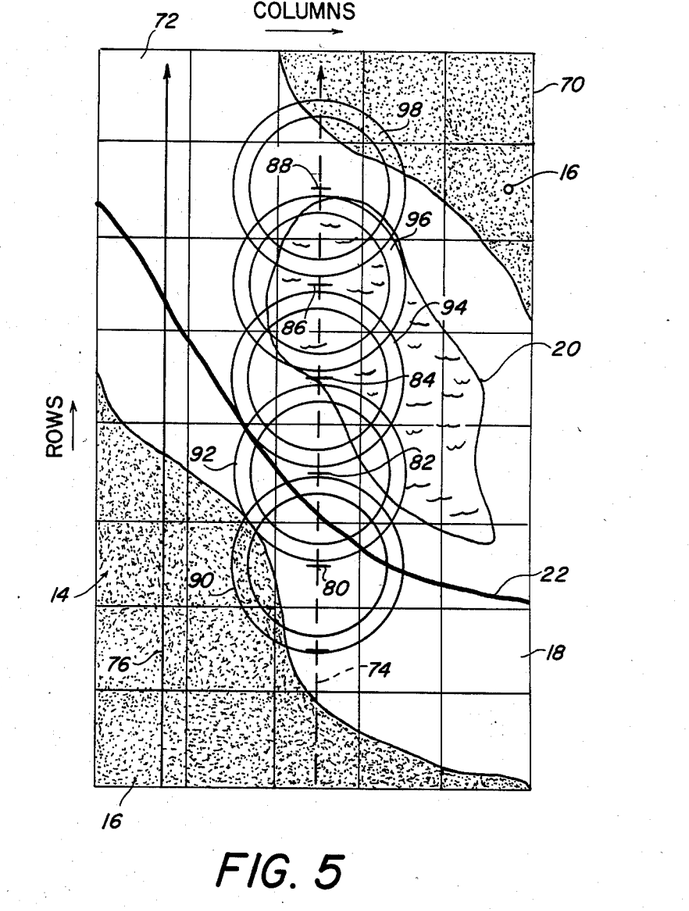
FIG. 5 is a cartographic view of a flat terrain section and such view has superimposed thereon a multicell grid pattern of the section together with the actual and intended ground tracks in dotted and solid lines of an airborne vehicle wherein the dotted line ground track is provided with a series of spaced points and a concentric ring about each point of the series that are indicative of some of the areas of impact of a series of relatively spaced radar pulses from the improved guidance system on the vehicle.

As indicated in FIG. 5, terrain 14 has superimposed thereon a grid pattern 70 of a series of uniform square sections or cells 72 so as to divide up the terrain into a rectangular coordinate system of five (5) columns and eight (8) rows of adjoining and interconnected cells. As further shown in FIG. 5, the actual ground track of aircraft 10 along terrain 14 as will be sensed by a series of radar pulses from system 10 is depicted by dotted arrowed line 74. On the other hand, the intended ground track of aircraft 10 along terrain 14 is indicated by a parallel-spaced arrowed solid line 76. When system 10 transmits a radar pulse 33 from its antenna 30, the pulse propagates from the antenna until it impacts terrain 14 at a predetermined point 80 as shown in FIG. 1. By reason of the continued outward expansion of pulse 33 as it propagates from altimeter antenna 31 at the speed of light, it impacts terrain 14 in an ever-enlarging concentric circle about point 80 until the pulse dissipates. Since pulse 33 impacts terrain 14 at point 80 that includes one part of field 18 as well as impacts in ever-expanding concentric annuli about point 80 that includes other parts of field 18, water 20, road 22 or any combination thereof, the reflected analog echo signature of pulse 33 for a known altitude of aircraft 10 will indicate at any ground radial point from point 80 the average-weighted reflectivity value of various portions of the field, water and road thereabout.

Since a series of radar pulses at predetermined time intervals are required to be transmitted by system 24 for impacting terrain 14 so as to determine ground track 74 of aircraft 10, clock 34 functions to drive processor 26 in order that each radar pulse 27 will impact terrain 14 at a point that corresponds to the center of a grid cell 72 of grid 70 as stored in memory 32. For purposes of illustration, system 24 will be described in a radar-pulse operative mode where a series of five radar pulses are transmitted at predetermined time intervals that impact terrain 14 at a corresponding series of initial impact points 80, 82, 84, 86 and 88 as illustrated in FIG. 5. Each impact point 80, 82, 84, 86 or 88 corresponds to the center of a grid cell 70 with which it is associated. Moreover, it is to be understood that, depending upon the requirements for accurately determining the actual ground track of aircraft 10 and the time permitted for making such determination, any suitable number of radar pulses can be transmitted by altimeter 28 during use of system 24. In other words, the greater number of pulses for impacting terrain 14 provides greater accuracy in determining the ground track of aircraft 10.

As further evident from FIG. 1, when radar pulse 33 is transmitted from altimeter 28, it, for all practical purposes, expands radially and uniformly outward from about nadir or altitude line "h". When the expanded pulse impacts terrain 14 about point 80 the outer radial extent of the impacted pulse at any point in time can be indicated by a radial line "R" extending from antenna 31 to a point on the outer extent of the signal as it continues to impact, with respect to time, an increasing area of terrain 14 about point 80. The angle between divergent lines "h" and "R" is designated angle "$\theta$". In order to minimize bandwidth requirements of system 24 in analyzing the echo signature of each pulse after impacting terrain 14 at a preselected point, e.g., point 80, an outer annulus 90 of radar-pulse-impacted terrain 14 about point 80 is selected, such as, e.g., the outer annulus of nominal width where its center circumference about point 80 is intersected at one point by the outer end of radial line "R". As will become more apparent hereinafter, one of the reasons for selecting outer annulus 90 of the echo signature about point 80 is that the electronic characteristics of system 24 will function with a minimal bandwidth when the range resolution is about ten feet and the delay sample time is about fifty nanoseconds (50 ns). Thus, the remaining initial pulse-impacted terrain points 82, 84, 86, or 88 of the remaining series of four subsequent pulses 33 by altimeter 28 is each provided with its annulus 92, 94, 96 or 98 that geometrically corresponds to annulus 90 as shown in FIG. 5. The average weighted reflectivity value of each annulus 90, 92, 94, 96 or 98 is analyzed by system 24 in determining the ground track of aircraft 10.

Figure 6:
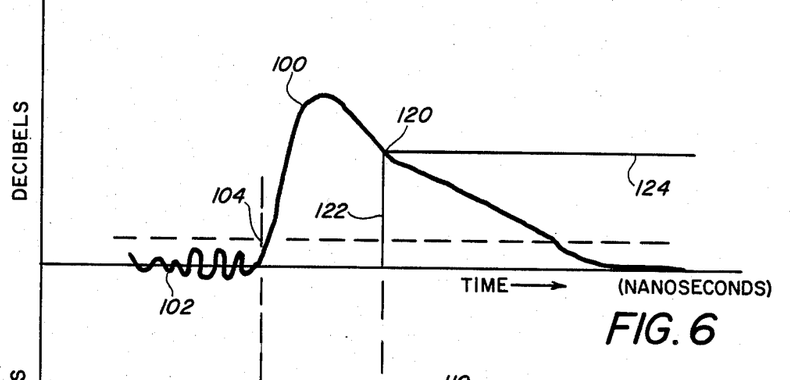
FIG. 6 is a schematic view of an echo signal signature in relation to time as received from a radar-pulse-impacted area about a ground track point of substantially flat terrain and further illustrates an analog quantity of constant value as extracted from the echo signal at a predetermined point in time and in relation thereto.

An analog echo signature 100 with respect to time of each pulse impacted area about a terrain point, e.g., 80, in FIG. 1, is usually of the form shown in FIG. 6 for a known aircraft altitude. The initial part of the signature corresponds to noise as indicated by undulating portion 102 of signature 100. As the result of the operative mode of FIG. 4 of system 24 for determining threshold noise level, threshold level has been determined for signature 100 as indicated by dotted line 104 in FIG. 6. Depending on the average-weighted reflectivity values of random and different features about a radar pulse-impacted terrain point; it is to be understood that the downward slope of signature 100, which is representative of the reflectivity values of the outer annuli about a given point, (e.g., point 80 of FIG. 1) can be higher or lower than that shown in FIG. 6.

Figure 6A:
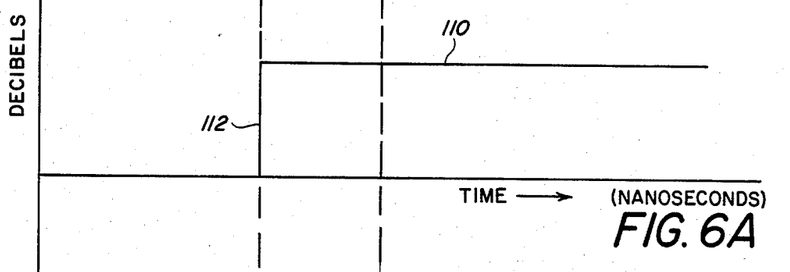
FIG. 6A is a schematic view of the comparator output in relation to the echo signal of FIG. 6.
Figure 6B:
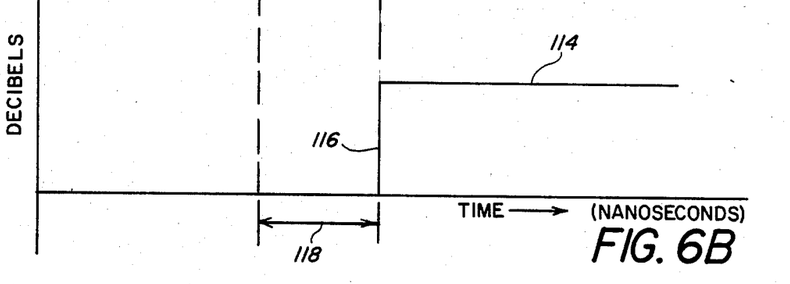
FIG. 6B is a schematic view of the delay line output and illustrates in dotted lines the relationship of the delay line output with the signals of FIGS. 6 and 6A.
Figure 7:
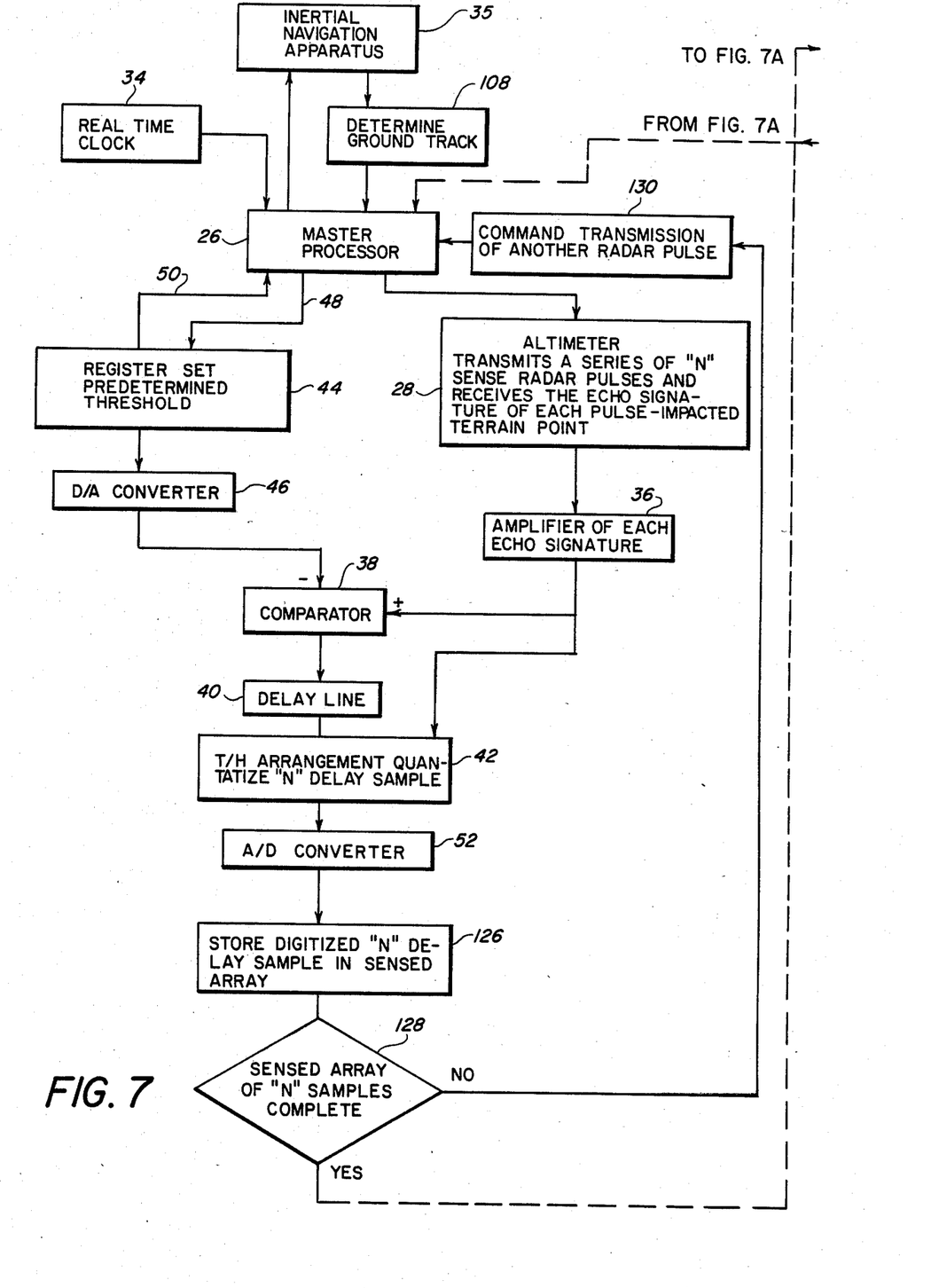
FIGS. 7 and 7A are diagrammatic views of another flow chart of a radar pulse operative embodiment of the guidance system.

In a radar-pulse operative mode of system 24, processor 26 in response to a command signal from apparatus 35 will cause altimeter 28 to transmit a series of radar pulses at predetermined time intervals in accordance with the output of clock 34 as indicated by elements 108 in the flow chart of FIG. 7. The analog echo signature output of a given pulse-impacted terrain point of amplifier 36 is divided between the forward bias input of comparator 38 and the analog input of T/H arrangement 42. By reason of the predetermined threshold value of register 44, comparator 38 provides a constant output above noise level as depicted by signal 110 in FIG. 6A. The leading edge 112 of signal 110 corresponds to threshold point 104 of FIG. 6. As result of comparator output signal 110 being subjected to the action of device 40, its leading edge 112 is delayed a predetermined amount of time as indicated by delayed signal 114 with its leading edge 116 as illustrated in FIG. 6B. The predetermined time delay as indicated by arrowed line 118 in FIG. 6B, of each delayed output signal 114 of an echo signature to be analyzed substantially corresponds to the central radius of an annulus of reflectivity to be analyzed by system 24 about a radar-pulse-impacted point of terrain 14. T/H arrangement 42 functions to correlate the other divided analog output of an echo signature of amplifier 36 with the delayed and transformed comparator output of the echo signature by device 40. As the result of this correlation and as further indicated by FIG. 6, an intersection point 120 is determined between analog and delayed signals 100 and 114 respectively. This point 120 is a quantitized value that is proportional to the average weighted reflectivity of annulus 90 about a pulse-impacted point 80 of terrain 14.

Since output 124 of T/H arrangement 42 is of a constant value and includes point 120, it is adventageously transformed into digital form by converter 52 as illustrated in FIGS. 6 and 7. Since the digital output of each echo signature from converter 52 corresponds to a sensed digital value of an annulus of reflectivity about a pulse-impacted terrain point; the sensed value is stored by element 126 as a sensed delay sample of a profile sensed array. When a predetermined number of sensed samples are stored by element 126, the "yes" output of element 128 will indicate that no further radar pulses will have to be transmitted by altimeter 28 as commanded by element 130 to processor 26 in accordance with the predetermined time intervals of clock 34 in the manner shown in FIGS. 7-7A.

For purposes of illustration, it is assumed that a series of five (5) radar pulses are to be transmitted by altimeter 28 so as to impact a series of five terrain points 80, 82, 84, 86 and 88 as shown in FIG. 6. Each point 80, 82, 84, 86 and 88 corresponds to the center of an adjoining cell 72 along intermediate or third column of grid 70. The series of five impacted points indicate results in the formation of line 74 that indicates the actual ground track of aircraft 10. Since the space between adjoining points 80 and 82, 82 and 84, 84 and 86 or 86 and 88 corresponds to a predetermined and uniform time interval of clock 34, it is to be understood that the time interval can be selected so any desired space exists between adjoining points 80 and 82, such as, e.g., several hundred feet. Similarly, instead of a series of five radar pulses to determine the actual ground track of aircraft 10 at a given altitude, element 128 in the flow chart of FIGS. 7-7A can be arranged to function so as to provide any number of sample values for a sensed array such as, e.g., sixty samples in response to sixty radar pulses so as to more accurately determine ground track 74 of aircraft 10.

Figure 8:
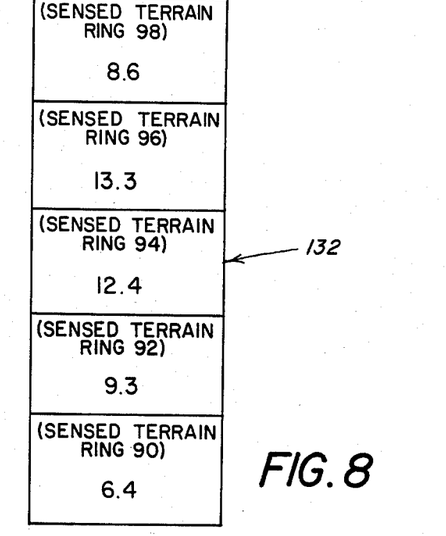
FIG. 8 is a diagrammatic view that indicates a single array of a series of digitized sample values as obtained from a plurality of echo signatures during aircraft use of the invention.
Figure 9:
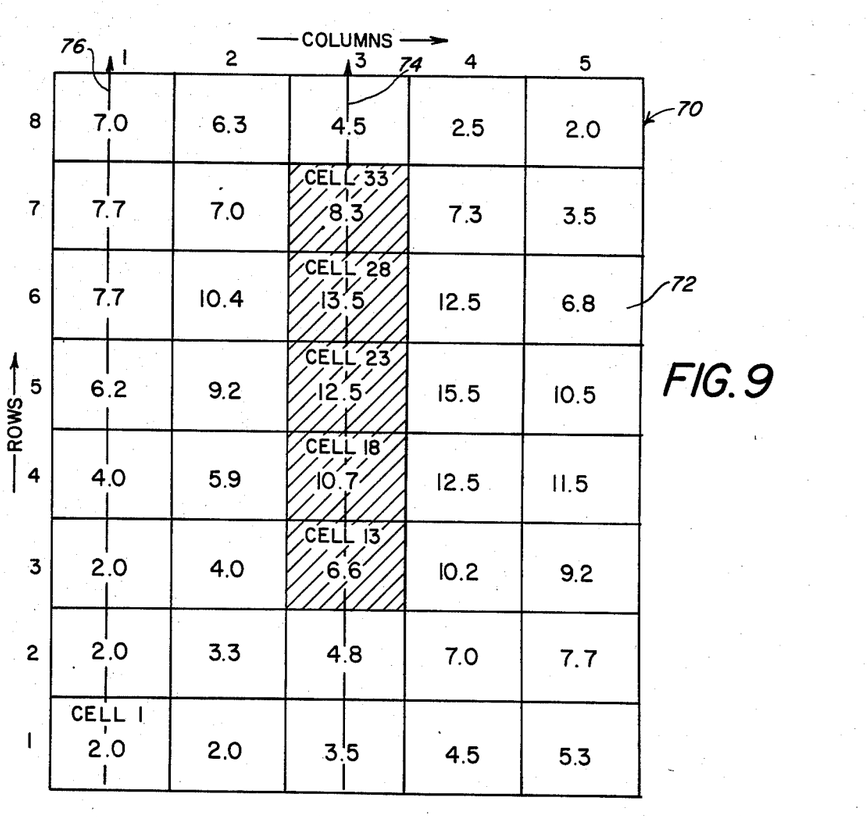
FIG. 9 is a schematic view of the multicell grid pattern for the terrain section of FIG. 4 together with the stored and predetermined average-weighted reflectivity value of each cell wherein the reflectivity value of each cell is indicative of a preselected delay sample annulus area thereabout at a given altitude of the aircraft.
Figure 10:
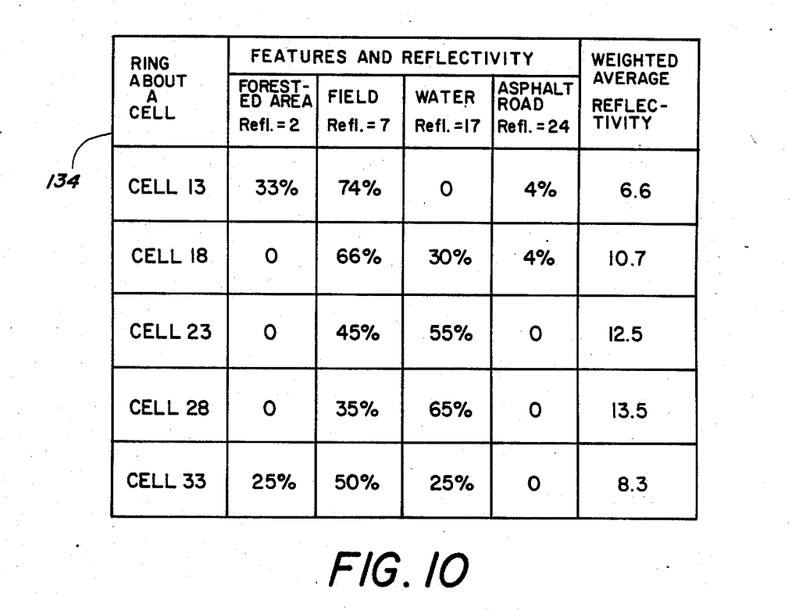
FIG. 10 is a table that illustrates a technique for determining reflectivity values of certain cells of the grid of FIG. 9.

Assuming that element 128 has obtained a sample array of five annuli of reflectivity values of a series of five points as indicated by profile sample 132 at a given altitude of aircraft 10, this sample is now matched and correlated with grid pattern (or matrix) 70 of predetermined reflectivity values at the same altitude as shown in FIGS. 8 and 9. Since terrain 14 has random and different features and since the selected annulus of reflectivity about each point has a radius greater than the length or width of each cell 72, the cells of grid 70 have different values of reflectivity as representative of each annulus about the center point of a given cell as depicted in the matrix of FIG. 9. As depicted in FIG. 10, table 134 is representative of one technique for determining the average weighted reflectivity value of an annulus about the pulse-impacted point of a grid cell 72. As shown by table 134 the different and random features of terrain 14 are assigned different reflectivity values. Then for the preselected ring or annulus about cell 13 that is related to pulse-impacted center point 80 of FIG. 5, it is evident that the ring encompasses thirty-three percent (33%) of forested area 16, sixty-three percent (63%) of field 18, zero percent (0%) of water 20 and four percent (4%) of asphalt road 22. Then multiplying the percentage of each feature with its assigned and predetermined reflectivity value for annulus 90, the average-weighted reflectivity value is determined. In other words, 33% times 2.0+63% times 7+4% times 24.0=0.66+4.41+0.96≅6.0 for cell 13 that corresponds to annulus 90 as sensed by system 10. In similar fashion, the average weighted reflectivity value is determined for cell 18, 23, 28 or 33 that corresponds to sensed annulus 92, 94, 96 or 98 respectively. As evident from FIGS. 8-10, the sensed values of reflectivity of rings 90, 92, 94, 96 and 98 is slightly different than the predetermined calculated values for cells 13, 18, 23, 28 and 33 of grid 70. One of the reasons for this difference is that the reflectivity values for the different features of terrain vary from day to day such as when they were first calculated from preselected data in forming reference grid 70 prior to flight of aircraft 10 and then subsequently the reflectivity values of terrain 14 were sensed and electronically analyzed by system 24 as aforedescribed during flight of aircraft 10.

When element 128 indicates that a sensed sample array 132 having a series of five delay samples has been obtained by system 24 during its use, then the "yes" output of element 128 commands element 134 to search for matrix or grid 70 at the known altitude of aircraft 10 having a data array that is substantially matched by the sensed profile as indicated in FIGS. 7-7A, and 8-9. It is evident from shadowed area 136 of FIG. 9 that cells 13, 18, 23, 28 and 33 are substantially matched by sensed profile 132.

Figure 7A:
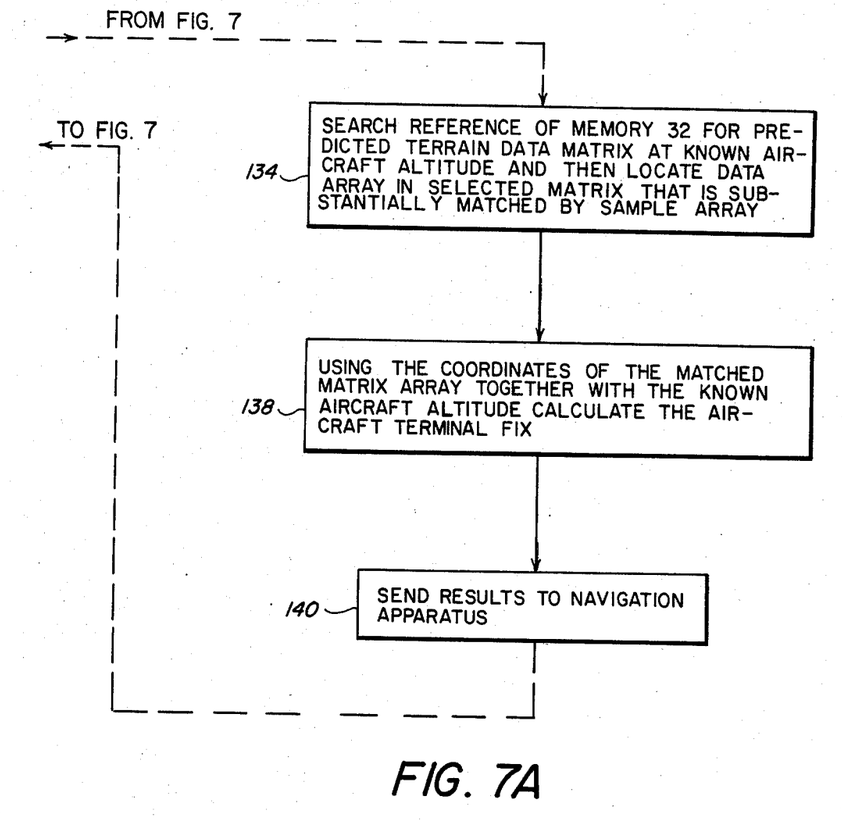

Since shadowed area 136 of matrix 70 indicates actual ground track 74 of aircraft 10; processor 26 then functions as indicated by element 138 in FIG. 7A to determine the difference, if any, between intended and actual ground tracks 74 and 76. Then, if a difference exists between tracks 74 and 76 as shown in FIG. 5, element 140 of FIG. 7A causes processor 26 to transmit a signal to apparatus 54 for correcting the flight path of aircraft 10 prior to its destination or striking a target.

It is noted here that memory 32 is provided with a plurality of stored matrices (data base) where each matrix of the plurality has a grid cell pattern similar to the cell pattern of grid 70 and each matrix corresponds to a given but different altitude. And of course any cell of each stored matrix for a given aircraft altitude has a reflectivity value that is different from the reflectivity value of a corresponding cell of any other stored matrix for a different aircraft altitude. In other words, the reflectivity of a pulse-impacted terrain point is a function of altitude as well as the random and different features thereabout. Matrix 70 indicates the calculated reflectivity value of the preselected annulus about each cell when the aircraft was at an altitude of 20,000 feet.

In one reduction to practice of system 24, it operated at a minimum bandwidth (B) of about fifty megahertz (50 MHz) and the system radar range resolution ($\Delta r$) is about ten feet (10 ft). As evident from FIGS. 1 and 1A, triangles ACB and EDB are similar right triangles. DB of triangle EDB corresponds to $\Delta r$. With a B of 50 MHz and $\Delta r$ of 10.0 ft it can be mathematically shown that $\Delta R$ is two hundred feet (200.0 ft) when the altitude (h) of aircraft 10 is twenty thousand feet (20,000 ft). With this altitude, delay line 40 functions to delay leading edge 116 of curve 114, fifty nanoseconds (50.0 ns) as shown in FIG. 6B.

Figure 11:
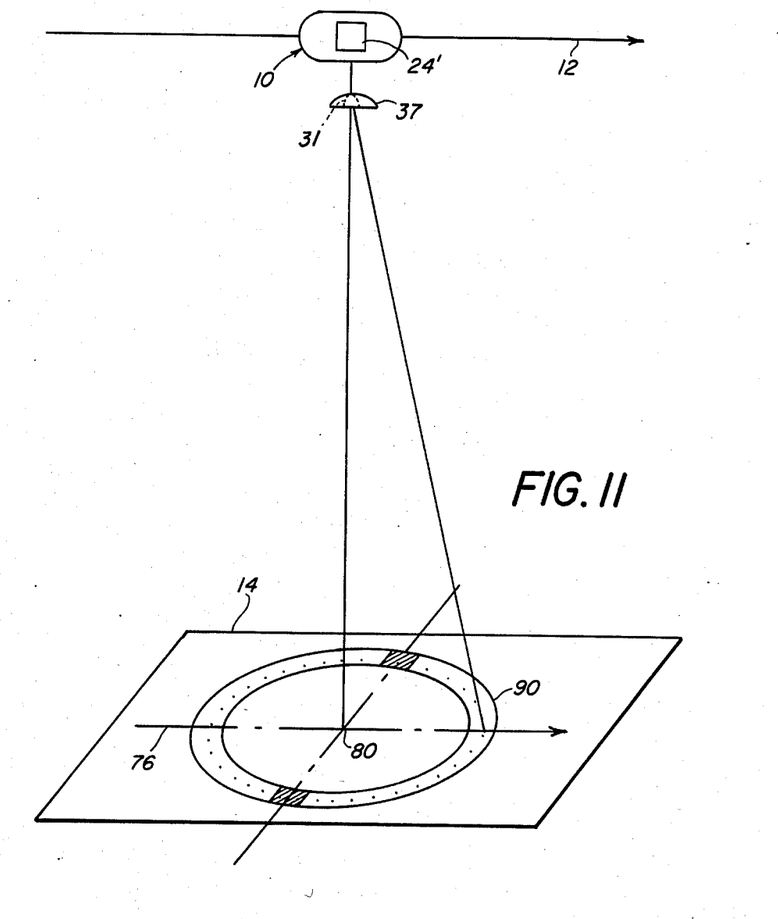
FIG. 11 is a schematic view of another embodiment of the invention that utilizes a delay Doppler sampling technique.
Figure 12:
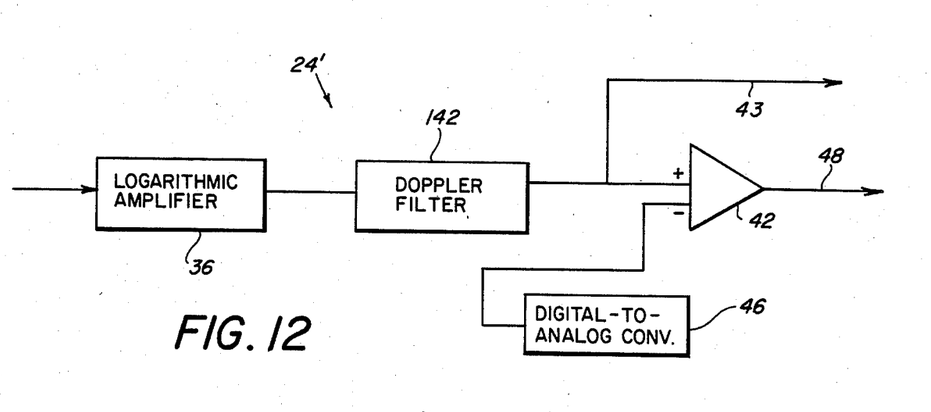
FIG. 12 is a diagrammatic view of a video signal processor with parts removed and other parts added and illustrates details of the other embodiment of FIG. 11.

Another embodiment of the guidance system of the invention is illustrated in FIG. 11. The video signal processor of guidance system 24' is provided with a Doppler filter 142 that is interposed between and serially interconnected to amplifier 36 and comparator 42 as shown in FIG. 12. By virtue of the Doppler filter all unit areas of the echo signal about a pulse-impacted ground point, e.g., point 80, are removed except for diametrically opposed unit areas of the echo signal that are disposed at generally right angles to ground track 76 of aircraft 10 as depicted in FIG. 11. Then, when sample device extracts a delay sample from the Doppler filtered echo signal, it will only include diametrically opposed unit areas within a ring 90 of the echo signal at a predetermined time interval. Although the filter reduces the magnitude of the echo signal and the sample extracted therefrom, it provides a sample with less noise effects and thus enables guidance system 24' to have greater sensitivity in matching a sensed profile with a matrix of memory 32 and a data array thereof.

Obviously, many modifications and variations of the present invention are possible in light of the above teachings. It is therefore to be understood that, within the scope of the appended claims, the invention may be practiced than as otherwise specifically described.

What is claimed is:

1. A radar guidance system for the navigation apparatus of an airborne vehicle, said system comprising:
   radar altimeter means for transmitting a series of pulses for impacting a series of relatively spaced points along the vehicle ground track of substantially flat terrain having random and different features,
   video signal processor means connected to the altimeter means for receiving the echo signal from each pulse-impacted point of the series, the echo signal of a given pulse-impacted point being indicative of the average weighted reflectivity of one or more random and different terrain features surrounding the given point, said video signal processor means being comprised of logarithmic amplifier means, comparator means, delay line means, and track-and-hold means, said comparator means and said track-and-hold means being parallel connected to the output of said logarithmic amplifier means, said delay line means being connected to the output of the comparator means, said track and hold means being connected to the output of the delay line means, said track and hold means for receiving and correlating the outputs of the amplifier means and the delay line means in order to determine a point of intersection therebetween that is indicative of a qunatitized value of a delay sample of an annulus made up of one or more random and different terrain features of average-weighted reflectivity of an echo signal about a given pulse-impacted point along the vehicle ground track during system use,
   said video signal processor means being provided with further means, said further means being connected to the output of the track and hold means, for transforming the delay sample of each annulus into a digital signal, and
   master processor means connected to the output of the further means for combining a series of digital signals of the video signal processor means into an arrayed output and then comparing the arrayed output with a series of stored digital arrays arranged in matrix fashion in order to ascertain which stored digital array of the series thereof is substantially matched by the arrayed output for the purpose of enabling the determination whether the actual ground track of the vehicle corresponds to the intended ground track thereof.

2. A system as set forth in claim 1 wherein said further means is analog-to-digital converter means.

3. A system as set forth in claim 1 wherein each pulse is of compressed duration and of teardrop configuration.

4. A system as set forth in claim 1 wherein said vehicle is a missile.

5. A system as set forth in claim 1 wherein said further means is analog-to-digital converter means.

6. A system as set forth in claim 1 wherein register means and digital-to-analog converter means are series interconnected between said master processor means and said comparator means, said master processor means together with said register means and said digital-to-analog converter means all cooperating to determine a threshold bias level output to the comparator means for the purpose of removing background noise from an echo signal during system use.

7. A system as set forth in claim 1 wherein said video signal processor means includes Doppler filter means.

8. A radar guidance system for the navigation apparatus of an airborne vehicle, said system comprising:
   master processor means,
   radar altimeter means connected to an output of the processor means and operating in response to the output of the processor means for transmitting a series of pulses for impacting a series of relatively spaced points along the vehicle ground track of substantially flat terrain and further operating to receive an echo signal from each pulse-impacted point of the series of spaced points,
   video signal processor means generally made up of logarithmic amplifier means, comparator means, delay line means and track and hold means, said amplifier means being connected to the output of said altimeter means and receiving from the output of the altimeter means the echo signal of each pulse-impacted point, the output of said amplifier means being parallel connected to the positive input of the comparator means and the track and hold means, the track and hold means and the delay line means being series interconnected to the output of the comparator means such that the track and hold means is connected to the output of the delay line means, the delay line means for delaying the leading edge of the output of the comparator means a predetermined amount of time, the track and hold means for correlating the outputs of the amplifier means and the delay line means so as to form a point of intersection between the outputs, such intersection point being quantization of a delay sample of an annulus of the echo signal about a given pulse-impacted point along the vehicle ground track where each delay sample is representative of the reflectivity of an annulus about a pulse-impacted point; and where the annulus is made up of one or more random and different terrain features,
   said video signal processor means being comprised of digital-to-analog converter means and threshold register means, the digital-to-analog converter means and the register means being series interconnected such that the output of the digital-to-analog converter means is connected to the negative bias input of the comparator means and the input of the register means is connected to another output of the master processor means, said register means including feedback means connected to the master processor means, the other output of said master processor means together with the feedback means of said register means causing selective adjustment of the negative bias of said comparator means in order to determine the threshold noise level of each echo signal so as to substantially eliminate noise from the output of the comparator means when a series of amplified echo signals are received by the positive input of the comparator means as the result of a series of pulses being transmitted from said altimeter means for impacting a series of relatively spaced points along the vehicle ground track during system use, and
   converter means connected to the output of the track and hold means for transforming the quantization of the delay sample of each echo signal into a digital signal,
   said master processor means being connected to the output of the converter means for combining a series of digital signals into an array and comparing the digital signal array with a plurality of digital signal arrays as arranged in a reference matrix in order to ascertain which array of the plurality of matrixed digital arrays is substantially matched by the digital array of the combined series of signals of the delay samples so as to determine whether the actual ground track of the vehicle corresponds to the intended ground track thereof.

9. A system as set forth in claim 8 wherein each pulse transmitted by said altimeter means is of compressed duration and teardrop configuration.

10. A system as set forth in claim 8 wherein said video signal processor means includes Doppler filter means.

11. A method for determining the actual ground track of an airborne vehicle; said method comprising the steps of:
  transmitting a series of electromagnetic pulses from the vehicle in a downward direction for impacting a plurality of preselected relatively spaced points along the vehicle ground track of relatively flat terrain, where each pulse of the series is transmitted at a predetermined time interval and is directed toward its respective point of the plurality of preselected points along the vehicle ground track, and where the terrain has different reflectivity characteristics by virtue of random and different features therealong,
  receiving at the vehicle an echo signal from each pulse-impacted point of the series of pulse-impacted and relatively spaced points along the vehicle ground track while at the same time amplifying each received echo signal,
  dividing each amplified echo signal,
  comparing one of the divided signals of each amplified echo signal with a predetermined negative bias level for the purpose of substantially eliminating background noise therefrom while at the same time transforming the compared signal into a substantial constant output,
  delaying the leading edge of the constant output of the compared signal of each amplified echo signal a predetermined amount so that the delayed edge is within the duration of the envelope of its associated divided signal,
  correlating the divided signals of each amplified echo signal such that the delayed leading edge of the compared signal is correlated with its associated divided signal so as to determine for each amplified echo signal an intersection point between its compared signal and its associated divided signal, the intersection point of each amplified echo signal representing the quantitized value of a delay sample thereof where any delay sample of a given amplified echo signal that stems from its associated pulse-impacted point along the ground track is indicative of the average weighted aggregate reflectivity of an annulus of one or more random and different terrain features about the associated pulse-impacted point therealong,
  transforming the delay sample of each echo signal into a digital format,
  combining all of the digital formats of the samples into a data array, and
  analytically correlating the data array of the samples with reference matrix data having a series of data arrays for the purpose of substantially matching the data array of the sample with one data array of the series of data arrays of the reference matrix data so as to enable the determination of whether the actual ground track of the vehicle corresponds to the intended ground track thereof.

12. A method as set forth in claim 11 wherein the step of comparing is effected by comparator means.

13. A method as set forth in claim 11 wherein the combined steps of amplifying, dividing, comparing, delaying, correlating and transforming is effected by video signal processor means.

14. A method as set forth in claim 11 wherein the steps of combining and analytically correlating is effected by master processor means.

15. A method as set forth in claim 11 wherein the step of delaying is effected by delay line means.

16. A method as set forth in claim 11 wherein the step of correlating is effected by track and hold means.

17. A method as set forth in claim 11 wherein the step of transforming is effected by analog-to-digital means.

18. A method as set forth in claim 11 wherein the step of amplifying is effected by logarithmic amplifier means.

19. A method as set forth in claim 11 wherein the steps of transmitting and receiving is effected by radar altimeter means.

* * * * *